(12) United States Patent
Dudley et al.

(10) Patent No.: US 7,644,192 B2
(45) Date of Patent: Jan. 5, 2010

(54) ANALYZING THE BEHAVIOR OF A STORAGE SYSTEM

(75) Inventors: Martin Clive Dudley, Waterlooville (GB); Nicholas John Granger-Brown, Waterlooville (GB); Matthew Philip Latter, Horndean (GB); Christopher Edward Robert Smart, Horndean (GB)

(73) Assignee: Hitachi Global Storage Technologies Netherlands B.V, Amsterdam (NL)

( * ) Notice: Subject to any disclaimer, the term of this patent is extended or adjusted under 35 U.S.C. 154(b) by 269 days.

(21) Appl. No.: 11/509,971

(22) Filed: Aug. 25, 2006

(65) Prior Publication Data

US 2007/0088861 A1 Apr. 19, 2007

(30) Foreign Application Priority Data

Aug. 25, 2005 (EP) .................................. 05255239

(51) Int. Cl.
 *G06F 3/00* (2006.01)
(52) U.S. Cl. ..................... 710/5; 710/15; 714/E11.189; 714/E11.192; 714/E11.193; 714/E11.197; 714/47
(58) Field of Classification Search ................... 710/15, 710/5; 714/E11.189, E11.192, E11.193, 714/E11.197, 47
See application file for complete search history.

(56) References Cited

U.S. PATENT DOCUMENTS 5,898,863 A 4/1999 Ofer et al. ..................... 703/21
6,067,643 A 5/2000 Omtzigt ........................ 714/47
7,035,970 B1* 4/2006 Zahavi ........................ 711/114
7,065,624 B1* 6/2006 Zahavi ........................ 711/170
2002/0108016 A1 8/2002 Haines et al. ................. 711/12
2004/0215912 A1* 10/2004 Vergis et al. ................. 711/170
2005/0182911 A1* 8/2005 Kaiser ......................... 711/170
2006/0074970 A1* 4/2006 Narayanan et al. .......... 707/102

FOREIGN PATENT DOCUMENTS

WO WO 93/04428 A 3/1993

OTHER PUBLICATIONS

'Using Magpie for Request Extraction and Workload Modelling' by Barham et al., Proceedings of the 6th Symposium on Operating Systems Design and Implementation, Dec. 2004.*

(Continued)

*Primary Examiner*—Henry W. H. Tsai
*Assistant Examiner*—Steven G Snyder (57) ABSTRACT

In order to investigate the behavior of a data storage system, the time differences between commands from an analysis device and the completion of the operations defined by those commands are analyzed. The method may use a factorial parameter table definition representing common threads of I/O events in a patterned, cyclic nature, using a host computer as the host application emulator and data logger. The workload definition is provided either from hypothetical proposed thread parameters, or by statistical and common factorial analysis of real application I/O traffic analysis, or a combination of both. The generated workloads can be run while measuring the I/O event completion timings and event queuing characteristics, facilitating engineering interpretation of results for the purpose of analyzing the effects of workload and system architectural design factors, and optimization or evaluation of total system configurations.

7 Claims, 9 Drawing Sheets

OTHER PUBLICATIONS

'Memory System Characterization of Commercial Workloads' by Barroso et al., Proceedings of the 25th International Symposium on Computer Architecture, Jun. 1998.*

HPL-SSP-2001-4: Simple Table-based Modeling of Storage Devices' by Anderson, Hewlett-Packard Laboratories, 2001.*

Ganger et al., "Using System-Level Models to Evaluate I/O Subsystem Designs," IEEE Trans. on Computers, vol. 47, No. 6, pp. 667-678, Jun. 1998.

Agrawal et al., "Measurement and Analysis of Disk I/O in UNIX Environments," Computer Measurement Group, 1997, pp. 351-362.

Gomez et al., "A New Approach in the Modeling and Generation of Synthetic Disk Workload," IEEE Trans. MAG, Aug. 29-Sep. 1, 2000, pp. 199-206.

Ganger, "Generating Representative Synthetic Workloads—An Unsolved Problem," Proceedings of the Computer Measurement Group, pp. 1263-1269, Dec. 1995.

Matsuda et al., "Mass Memory System Performance Measurement," Review of the Electrical Communication Laboratories, vol. 29, No. 5-6, pp. 451-463, May-Jun. 1981.

* cited by examiner

| Command | LBA | Sector Count | Timestamp (s) |
|---|---|---|---|
| W | 125211601 | 1280 | 0.406689 |
| R | 120716241 | 1264 | 0.674804 |
| W | 125212881 | 1240 | 1.011683 |
| R | 120717505 | 1280 | 1.273776 |
| W | 125214121 | 1204 | 1.608292 |
| R | 120718785 | 1300 | 1.861929 |
| W | 125215325 | 1196 | 2.210961 |
| R | 120720085 | 1312 | 2.359189 |
| W | 125216521 | 1172 | 2.799421 |
| R | 120721397 | 1364 | 2.954702 |
| W | 125217693 | 1216 | 3.409543 |
| R | 120722761 | 1344 | 3.569032 |
| W | 125218909 | 1124 | 4.008272 |
| R | 120724105 | 1324 | 4.264882 |
| W | 125220033 | 1172 | 4.60815 |
| R | 120725429 | 1344 | 4.876057 |
| W | 125221205 | 1084 | 5.194108 |
| R | 120726773 | 1316 | 5.475187 |
| W | 125222289 | 1260 | 5.814258 |
| R | 120728089 | 1264 | 6.074252 |
| W | 125223549 | 1100 | 6.402919 |
| R | 120729353 | 1284 | 6.663289 |
| W | 125224649 | 1140 | 7.000931 |
| R | 120730637 | 1188 | 7.155428 |
| W | 125225789 | 1168 | 7.598539 |
| R | 120731825 | 1272 | 7.750542 |
| W | 125226957 | 1332 | 8.209446 |
| R | 120733097 | 1324 | 8.343266 |
| W | 125228289 | 812 | 8.790857 |
| R | 120734421 | 1084 | 8.840945 |
| W | 125229101 | 1144 | 9.412558 |
| R | 120735505 | 1352 | 9.454129 |
| W | 125230245 | 1168 | 10.00363 |
| R | 120736857 | 1280 | 10.047098 |
| W | 125231413 | 1556 | 10.612475 |
| R | 151593 | 32 | 10.639303 |
| R | 120738137 | 1144 | 10.700011 |
| R | 120739281 | 1160 | 11.126713 |
| W | 125232969 | 1480 | 11.217999 |
| W | 125234449 | 1312 | 11.803826 |
| R | 120740441 | 1372 | 11.853218 |
| R | 120741813 | 1124 | 12.321811 |

| GROUP | COMMAND | START LBA | END LBA | AVG SECTOR COUNT |
|---|---|---|---|---|
| 1 | READS | 20000 | 22000 | 32 |
| 2 | READS | 150000 | 160000 | 32 |
| 3 | READS | 120000000 | 125000000 | 1254 |
| 4 | WRITES | 20000 | 22000 | 32 |
| 5 | WRITES | 150000 | 160000 | 32 |
| 6 | WRITES | 120000000 | 125000000 | 1216 |

FIG. 6

| Random Seed | SPCModX | SPCModY | SPCBase | Result |
|---|---|---|---|---|
| 0.592234692 | 166 | 4 | 900 | 1292 |
| 0.365378363 | 166 | 4 | 900 | 1140 |
| 0.445184202 | 166 | 4 | 900 | 1192 |
| 0.06356113 | 166 | 4 | 900 | 940 |
| 0.415523087 | 166 | 4 | 900 | 1172 |
| 0.008268424 | 166 | 4 | 900 | 904 |
| 0.134283366 | 166 | 4 | 900 | 988 |
| 0.464303325 | 166 | 4 | 900 | 1208 |
| 0.761455348 | 166 | 4 | 900 | 1404 |
| 0.271515134 | 166 | 4 | 900 | 1080 |
| 0.916002463 | 166 | 4 | 900 | 1508 |
| 0.738998541 | 166 | 4 | 900 | 1388 |
| 0.321915046 | 166 | 4 | 900 | 1112 |
| 0.053162671 | 166 | 4 | 900 | 932 |
| 0.56611769 | 166 | 4 | 900 | 1272 |
| 0.974275002 | 166 | 4 | 900 | 1544 |
| 0.259827202 | 166 | 4 | 900 | 1072 |
| 0.825684604 | 166 | 4 | 900 | 1448 |
| 0.39666168 | 166 | 4 | 900 | 1160 |
| 0.997982419 | 166 | 4 | 900 | 1560 |
| 0.963831245 | 166 | 4 | 900 | 1536 |
| 0.695932441 | 166 | 4 | 900 | 1360 |
| 0.986303289 | 166 | 4 | 900 | 1552 |
| 0.049361061 | 166 | 4 | 900 | 932 |
| 0.925143879 | 166 | 4 | 900 | 1512 |
| 0.034183262 | 166 | 4 | 900 | 920 |
| 0.13601699 | 166 | 4 | 900 | 988 |
| 0.612353598 | 166 | 4 | 900 | 1304 |
| 0.77104175 | 166 | 4 | 900 | 1408 |

COMMAND AND LOCATION CONTROL

| Stream | Device | Stream Type | Start LBA | Range | LBAStep | Cycles |
|---|---|---|---|---|---|---|
| 1 | 0 | R | 200000 | 1000 | -4 | 1000000 |
| 2 | 1 | W | 1000000 | 500000 | 16 | 1000000 |
| 3 | 1 | R | 2000000 | 500000 | 1024 | 1000000 |

SECTOR COUNT CONTROL

| Stream | SectorsBase | Variance Fn | SPCModX | SPCModY | Start Delay |
|---|---|---|---|---|---|
| 1 | 32 | (F)ixed | 1 | 1 | 0 |
| 2 | 1024 | (R)andom | 32 | 16 | 500 |
| 3 | 1024 | (R)andom | 32 | 16 | 250 |

TIMING CONTROL

| Stream | IntervalBase | Variance | IntModX | IntModY | WaitBase | WaitModX | WaitModY |
|---|---|---|---|---|---|---|---|
| 1 | 25 | (R)andom | 5 | 1 | 1 | 0 | 0 |
| 2 | 400 | (F)ixed | 0 | 0 | 0 | 0 | 0 |
| 3 | 400 | (F)ixed | 0 | 0 | 0 | 0 | 0 |

FIG. 9

| Stream: | 1 | 2 | 3 | 4 | 5 | 6 | 7 | 8 | 9 | TOTAL |
|---|---|---|---|---|---|---|---|---|---|---|
| R/W/S: | R | W | W | R | R | W | W | R | W | |
| LBA: | 01500000x0 | 02A00000x0 | 07E00000x0 | 00005550x0 | 00028870x0 | 00005550x0 | 00028870x0 | 05F40000x0 | 05F40000x0 | |
| Time(ms) | | | | | | | | | | |
| 0 | 0 | 0 | 0 | 129 | 211 | 470 | 114 | 164 | 145 | 1233 |
| 1 | 0 | 0 | 0 | 66 | 96 | 232 | 81 | 100 | 89 | 664 |
| 2 | 0 | 0 | 0 | 0 | 5 | 0 | 0 | 9 | 0 | 14 |
| 3 | 0 | 0 | 0 | 0 | 3 | 0 | 0 | 0 | 0 | 3 |
| 4 | 0 | 0 | 0 | 0 | 2 | 0 | 0 | 0 | 0 | 2 |
| 5 | 0 | 1142 | 1385 | 0 | 0 | 0 | 0 | 0 | 0 | 2527 |
| 6 | 0 | 1284 | 1066 | 0 | 0 | 0 | 0 | 0 | 0 | 2350 |
| 7 | 0 | 448 | 368 | 0 | 0 | 0 | 0 | 0 | 0 | 816 |
| 8 | 0 | 156 | 147 | 0 | 3 | 0 | 0 | 0 | 0 | 306 |
| 9 | 0 | 0 | 0 | 0 | 3 | 0 | 0 | 0 | 0 | 3 |
| 10 | 0 | 0 | 0 | 0 | 7 | 0 | 0 | 0 | 0 | 7 |
| 11 | 0 | 0 | 0 | 0 | 6 | 0 | 0 | 0 | 0 | 6 |
| 12 | 0 | 0 | 0 | 0 | 10 | 0 | 0 | 0 | 0 | 10 |
| 13 | 0 | 0 | 1 | 1 | 5 | 0 | 0 | 0 | 0 | 7 |
| 14 | 0 | 0 | 0 | 2 | 0 | 0 | 0 | 0 | 0 | 2 |
| 15 | 0 | 0 | 0 | 0 | 0 | 0 | 0 | 0 | 0 | 0 |
| 16 | 0 | 0 | 0 | 0 | 0 | 0 | 0 | 0 | 0 | 0 |
| 17 | 0 | 0 | 0 | 2 | 0 | 0 | 0 | 0 | 0 | 2 |
| 18 | 0 | 0 | 0 | 2 | 0 | 0 | 0 | 0 | 0 | 2 |
| 19 | 6 | 0 | 0 | 1 | 0 | 0 | 0 | 0 | 0 | 7 |
| 20 | 22 | 0 | 0 | 1 | 0 | 0 | 0 | 0 | 0 | 23 |
| 21 | 87 | 0 | 0 | 2 | 0 | 0 | 0 | 0 | 0 | 89 |
| 22 | 73 | 0 | 0 | 5 | 0 | 0 | 0 | 0 | 0 | 78 |
| 23 | 71 | 0 | 0 | 0 | 0 | 0 | 0 | 6 | 0 | 77 |
| 24 | 87 | 0 | 0 | 0 | 0 | 0 | 0 | 1 | 0 | 88 |
| 25 | 86 | 0 | 0 | 1 | 0 | 0 | 0 | 4 | 0 | 91 |
| 26 | 84 | 0 | 0 | 2 | 0 | 0 | 0 | 5 | 0 | 91 |
| 27 | 89 | 0 | 0 | 0 | 0 | 0 | 0 | 6 | 0 | 95 |
| 28 | 87 | 0 | 0 | 0 | 0 | 0 | 0 | 4 | 0 | 91 |
| 29 | 88 | 0 | 0 | 3 | 0 | 0 | 0 | 0 | 0 | 91 |
| 30 | 86 | 0 | 0 | 0 | 0 | 0 | 0 | 1 | 0 | 87 |
| 31 | 84 | 0 | 0 | 0 | 0 | 0 | 0 | 4 | 0 | 88 |
| 32 | 86 | 0 | 0 | 4 | 0 | 0 | 0 | 5 | 0 | 95 |
| 33 | 104 | 0 | 0 | 0 | 0 | 0 | 0 | 3 | 0 | 107 |
| 34 | 102 | 0 | 0 | 0 | 0 | 0 | 0 | 0 | 0 | 102 |
| 35 | 98 | 0 | 0 | 1 | 0 | 0 | 0 | 0 | 0 | 99 |
| 36 | 97 | 0 | 0 | 1 | 0 | 0 | 0 | 0 | 0 | 98 |
| 37 | 106 | 0 | 1 | 0 | 0 | 0 | 0 | 0 | 0 | 107 |
| 38 | 97 | 0 | 0 | 1 | 0 | 0 | 0 | 0 | 0 | 98 |
| 39 | 111 | 0 | 1 | 0 | 0 | 0 | 0 | 0 | 0 | 112 |
| 40 | 116 | 0 | 0 | 0 | 0 | 0 | 0 | 0 | 0 | 116 |
| 41 | 107 | 0 | 0 | 0 | 0 | 0 | 0 | 0 | 0 | 107 |
| 42 | 79 | 0 | 0 | 0 | 0 | 0 | 0 | 0 | 0 | 79 |
| 43 | 56 | 0 | 0 | 0 | 0 | 0 | 0 | 0 | 0 | 56 |
| 44 | 35 | 0 | 0 | 0 | 0 | 0 | 0 | 0 | 0 | 35 |
| 45 | 23 | 0 | 0 | 0 | 0 | 0 | 0 | 0 | 0 | 23 |
| 46 | 38 | 0 | 0 | 0 | 0 | 0 | 0 | 0 | 0 | 38 |
| 47 | 32 | 0 | 0 | 1 | 0 | 0 | 0 | 0 | 0 | 33 |
| 48 | 29 | 0 | 0 | 0 | 0 | 0 | 0 | 0 | 0 | 29 |
| 49 | 32 | 0 | 0 | 1 | 0 | 0 | 0 | 0 | 0 | 33 |
| 50 | 38 | 0 | 0 | 0 | 0 | 0 | 0 | 0 | 0 | 38 |
| 51 | 31 | 0 | 0 | 0 | 0 | 0 | 0 | 0 | 0 | 31 |
| 52 | 28 | 0 | 0 | 1 | 0 | 0 | 0 | 0 | 0 | 29 |
| 53 | 44 | 0 | 0 | 0 | 0 | 0 | 0 | 0 | 0 | 44 |
| 54 | 26 | 0 | 0 | 1 | 0 | 0 | 0 | 0 | 0 | 27 |
| 55 | 27 | 0 | 0 | 0 | 0 | 0 | 0 | 0 | 0 | 27 |
| 56 | 29 | 0 | 0 | 0 | 0 | 0 | 0 | 0 | 0 | 29 |
| 57 | 30 | 0 | 0 | 0 | 0 | 0 | 0 | 0 | 0 | 30 |
| 58 | 24 | 0 | 0 | 0 | 0 | 0 | 0 | 0 | 0 | 24 |
| 59 | 31 | 0 | 0 | 0 | 0 | 0 | 0 | 0 | 0 | 31 |
| 60 | 34 | 0 | 0 | 0 | 0 | 0 | 0 | 0 | 0 | 34 |
| 61 | 22 | 0 | 0 | 0 | 0 | 0 | 0 | 0 | 0 | 22 |
| 62 | 22 | 0 | 0 | 0 | 0 | 0 | 0 | 0 | 0 | 22 |
| 63 | 30 | 0 | 0 | 1 | 0 | 0 | 0 | 0 | 0 | 31 |
| 64 | 20 | 0 | 0 | 0 | 0 | 0 | 0 | 0 | 0 | 20 |
| 65 | 30 | 0 | 0 | 0 | 0 | 0 | 0 | 0 | 0 | 30 |
| 66 | 17 | 0 | 0 | 2 | 0 | 0 | 0 | 0 | 0 | 19 |
| 67 | 20 | 0 | 0 | 0 | 0 | 0 | 0 | 0 | 0 | 20 |
| 68 | 22 | 0 | 0 | 0 | 0 | 0 | 0 | 0 | 0 | 22 |
| 69 | 18 | 0 | 0 | 0 | 0 | 0 | 0 | 0 | 0 | 18 |

ANALYZING THE BEHAVIOR OF A STORAGE SYSTEM

RELATED APPLICATION

The present application claims priority to European Patent Application No. EP05255239, filed Aug. 25, 2005, the entire contents of which are incorporated by reference herein.

BACKGROUND OF THE INVENTION

The present invention relates to the analysis of the behaviour of a storage system, such as a hard disk drive. It relates to a method of generating Input/Output (I/O) loads on the storage system and analysing the behaviour of the storage system under such workloads. It is particularly, but not exclusively, concerned with single and multi-thread workloads such as Audio/Visual (AV) applications which have isochronous and possibly additional anisochronous access characteristics, to permit replication and extension of those workloads.

The invention may be used with a host system to target storage system extension of I/O workload characteristics, and creation of new, hypothetical likely host data storage access patterns of applications and systems using a generic host computer.

As storage systems (single hard disk drives and arrays) are designed into more and more diverse applications, both host system and storage system designers need methods to evaluate the storage and I/O performance, functionality and overall suitability to the host application data access demands. Determining the time for each I/O operation to complete and how this performance measurement relates to the application and device configurations, will allow informed design or optimisation decisions to be made.

Host designers need to ensure the storage system is suitable for meeting the application needs, both in performance and reliability given an application usage profile, and to make design decisions including but not limited to; the best implementation of interface and data access pattern and typical command sector count, file system structure, physical storage device mounting etc . . . in order to optimise the total system design for required reliability and/or performance.

Storage device manufacturers need a way to explore how data access patterns and other host and storage design factors affect storage performance and command handling, so as to evaluate and improve storage design and operating mode optimisation for target applications.

A method is required which allows the generation of complex host application data access behaviour in order to test storage suitability. This access behaviour is based either on analysis of a real host system, followed by direct mimicking of this pattern, or modification of said access behaviour to explore evolutionary proposals, configuration choices, or purely hypothetical access behaviour pattern generation for new host application design proposals.

Once the required host application data access pattern has been generated, methods are required to measure the storage response times to individual I/O events and for statistical analysis of such data.

Typical storage I/O workload initiator software available, and other documented methods of I/O workload generation do not provide the flexibility to accurately define many typical but complex multi-threaded access patterns of emerging AV streaming devices. Some do not give accurate or absolute control over several progressive characteristics of an I/O event pattern, such as the exact storage addressing locations of individual thread I/O events, I/O transfer size and type characteristics. They typically offer only specific patterns or sequential/random options with weighting factors. They also do not offer specific time scheduling of independent and interrelated events of a data access workload, coupled with detailed timing response measurements at the thread level and statistical analysis of this data to assist in design and system optimisation. Other known ways of I/O workload generation are based on defining mean factors with heavy-tailed Poisson distributions, or specific mathematical distributions for several characteristics including spatial locality of I/O access request, I/O transfer sizes, I/O type and I/O request timing. These are typically based on extrapolation of characteristics from Asynchronous IT system workloads, where the mix of events from several client applications or processes are indeed high in characteristic variances. They therefore do not adequately capture and replicate the event sequence interrelationships of many AV application workloads, where many of the processes are continuous and regular data rate and access location pattern, with low variance or no variance in iterative event characteristics. Additionally, many storage performance measurement methods are concerned primarily with testing maximum storage system throughput, i.e., saturation of the storage system with I/O requests in a defined sequence to determine the overall data rate achieved, rather than offering the facility to deliver a timed arrival pattern. Therefore, these are not generally suitable for generating isochronous workload patterns or analysis of storage system behaviours under such workloads.

Alternatively, to achieve a realistic emulation of the proposed host application for the purpose of testing storage behaviour under specific isochronous and mixed thread workloads it would theoretically be possible to take actual programming of the actual step-by-step sequence of I/O commands, using an I/O sequencer, or record and playback of I/O activity from a real application. Step-by-step generation of a sequence is complex and time consuming. Record and replay is only possible where the real application exists. Neither of these approaches easily afford modification of the data access pattern characteristics, e.g. to enable a sensitivity study, without further extensive reprogramming.

SUMMARY OF THE INVENTION

A far simpler approach is to factorise the required complex access pattern, and express it as a set of algorithm parameters (factors) which define identified threads of common activity which a general host program 'engine' can use to generate a host I/O event sequence. Editing of this parameter list is much quicker than sequence reprogramming, so individual thread or global pattern factors can be quickly and easily modified to explore further related test cases.

Thus, at its most general, the present invention causes operations (also referred to as events or tasks) to run on a storage system, and completion of the operations be detected and recorded. In that way, by analysing the time differences for the operations, the behaviour of the storage system can be analyzed. For such a system to operate, each operation is defined by at least one command, with that command(s) being obtained by conversion of factors corresponding to the required operation, the factors including the timing characteristics of the operation.

Thus, a first aspect of the present invention may provide a method of analysing the behaviour of a storage system when running an I/O workload. The method comprises creating an isochronous thread formed by a sequence of operations to be carried out by the storage system when running the thread. The thread is created by defining a plurality of factors wherein each factor corresponds to an aspect of the thread when running the I/OI workload. The plurality of factors enable absolute control over iterative access location, transfer size and access type of the operations of said sequence of operations. Next, one or more timing factors corresponding to a frequency characteristic and a timing pattern for each of the operations of the sequence of operations is defined. The storage system runs the I/O workload by interpreting the one or more timing factors of each operation of said sequence of operations to determine a scheduled time for the corresponding operation. For each operation in the sequence of operations, the factors for each operation are interpreted to determine respective operation characteristics for the corresponding operation of the sequence of operations. For each operation in the sequence of operations, the operation characteristics are converted to at least one command for the storage system. Next, for each operation of the sequence of operations, at least one command is sent to the storage system to the storage system at a sending time being either the scheduled time or the earliest subsequent time the storage system is ready to accept at least one command of the respective operation of the sequence of operations, whichever is later. Next, the time of completion of each command of the corresponding operation by the storage system is detected. From the time of completion for each command of each operation of the sequence of operations, a time of completion is derived. The time difference between the sending time and the completion time for each operation of the sequence of operations is stored. Any operation start time latency is next stored. The start time latency is the difference in time between the scheduled time and the sending time for each operation of the sequence of operations. The behaviour of the storage system is analysed with the time differences and the operation start latencies of the sequence of operations.

Similarly, where there are multiple threads, a second aspect of the present invention may provide a method of analysing the behaviour of a storage system when running an I/O workload. The method comprises crating a plurality of threads being formed by a corresponding sequence of operations to be carried out by the storage system when running the respective thread. Each thread is created by defining a plurality of factors corresponding to an aspect of the thread when running the I/O workload, The plurality of factors of at least one of the threads enables absolute control over iterative access location, transfer size and access type of the operations of the sequence of operations. Each thread is further created by defining one or more timing factors corresponding to a frequency characteristic and a timing pattern for each of the operations of the sequence of operations. Next, the storage system runs the I/O workload by interpreting the one or more timing factors of each operation of the sequence of operations of each thread of the plurality of threads thereby defining an interleaved sequence of operations containing all the operations of all the plurality of threads including a scheduled time for each operation of said interleaved sequence of operations. For each operation in the interleaved sequence of operations, the factors for each operation are interpreted to determine respective operation characteristics of the corresponding operation of the interleaved sequence of operations. For each operation in the interleaved sequence of operations, at least once command is sent to the storage system at a sending time being either a scheduled time or the earliest subsequent time the storage system is ready to accept at least one command of the respective operation of the interleaved sequence of operations, whichever is later. The time of completion of each command of the corresponding operation by the storage system is next detected for each operation in the interleave sequence of operations. From the time of completion of each command of each operation of the interleaved sequence of operations, a time of completion is derived. The time difference between the sending time and the time of completion of the operation in the interleaved sequence of operations is stored. Furthermore, any operation start time latency is stored wherein the start time latency is the difference (if any) in time between the scheduled time and the sending time. The time differences and the operation start latencies are analysed to thereby analyse the behaviour of the storage system.

It is not readily possible to give a complete list of all possible factors which the present invention may use. These factors may include: writing data to said storage system; reading data from said storage system; the size of data to be transferred to or from said storage system; the start location of data writing or reading; and the address range.

Also, to achieve the accurate or absolute control, the factors may include values defining whether the sequence of operations of a given thread are to be carried out at incrementing or decrementing locations within a defined address range in said storage system such as would enable the emulation of playback and rewind function in an AV device for example, and the ability to define a step value—the spacing between the increments or decrements, and possibly alternatively, a factor value defining that the sequence of operations are to be carried out at random locations within a defined address range in said storage system.

Preferably, the analysing step analyses the operation start time latencies only when the duration of the respective operation start time latency is greater than a predetermined threshold value.

As mentioned above, the present invention derives from the time of completion of each command of each operation of said sequence of operations, a time of completion of the corresponding operation of the sequence of operations, and stores that time difference. It is also preferable to store, for subsequent use in the analysis section, the time difference between the sending time and the time of completion of each command for each operation of the sequence of operations.

The workloads can be adjusted by adjusting factors within the threads in order to alter the operational sequence or characteristics, or indeed by adding or removing threads. The method may be repeated for each workload test case.

Where there are a plurality of threads, the plurality of factors may enable absolute control over iterative access location, transfer size and access type of operations of the sequence of operations for only some of the threads.

For the present invention, the storage system is preferably a disk drive.

The present invention permits an algorithm and associated parameter structure to be defined to create host driver I/O data workloads in the target storage system wherein the term "host" is used to refer to the behaviour analysis device mentioned above.

It permits a factorial definition to be created representing patterns of I/O events in a single or multi-threaded I/O access pattern (workload); creating host application access patterns (workloads) with a general host computer as the application host emulator.

Other preferred features include:

(a) Timing and recording of individual I/O operation times; the invention measures and records individual storage I/O operation completion timing data from the operation of such an I/O access pattern (workload).

(b) The principal method is applicable to emulation of the host side of 1 to 1, 1 to many, many to 1 and many to many host/storage systems, and as such generates a required host workload at the storage system controller level. This allows direct testing and analysis of the (real) storage behaviour (response timings) in the application environment, by replacing the host with an equivalent test system which can create the workload while timing the storage response.

(c) Analysis and replication of existing host system workloads; thus providing a combination of general data analysis techniques (grouping, sorting and deriving basic statistics like mean, distribution etc . . . ) of existing host to storage data traffic flows, in order to derive a factorial definition of a number of threads which when combined, represent an equivalent I/O workload to the real host application.

(d) User generation of workload, real host system emulation, hypothetical workloads and factorial modification of workloads; this provides for user generation of test workloads. The workload definition step may be either based on observed real host I/O event characteristics or purely by hypothesis of new application access patterns. Further, existing workload definitions may be modified in order to explore design limits and optimisations by variation of the definition and modulation of algorithm parameters (factors). In particular, it may include the ability to define accurately, the physical device and location (logical block address) and contiguous sector ranges of a number of independent threads (data sets or streams defining tasks for the storage systems). Further, it may include definition of a function i.e. sequential, random variance, +/− step function and direction of subsequent event location variability with respect to the previous thread event location. Event trigger timings may similarly be recreated accurately using absolute intervals, random variance functions, immediate or throttled by wait periods.

(e) File system architectures; the flexibility of the algorithmic thread definition structure may be such that it can be used to represent complex and specific I/O behaviours e.g. file system architecture choices can be explored by recreating a specific sequence of commands as a thread event within the definition.

(f) Comparing operation timing data grouped by thread and in total (all threads combined); the individual I/O request to storage completion times may be measured and stored for each thread. Comparisons are therefore possible between threads and how thread definition factors alter these timings i.e. difference between access timings at outer diameters and inner diameters of a hard disk, how a given thread I/O architecture affects cache effectiveness etc . . . This also enables the determination of how external design characteristics i.e. mechanical mounting of the storage, or environmental conditions, affect the storage functional response and behaviour.

(g) I/O Latency Logs; thread level scheduled operation ageing (lateness) may be monitored over a definable threshold factor, so as to enable reporting of potential buffer overrun situations in isochronous systems such as AV streaming applications.

(h) Statistical analysis and design margin extraction; statistical analysis of operation I/O timings and operation ageing statistics enables calculation of system design margins such as storage busy time vs. idle time (Storage bus utilisation Duty Cycle and saturation).

(i) Comparison of test data sets/influence design on host and storage sides; comparison of several sets of data created by varying definition factors enables evaluation of many aspects of both host and storage design and performance. Results can directly influence design and optimisation decisions for the host and storage developer.

In the preferred embodiment of the invention, the sequencing apparatus (analysis design) may be a host computer connected to the storage system under test. The host will be programmed with an I/O generation and timing 'engine' program to read the user created definition data file and accordingly create the required host I/O operation sequence (i.e. the sequence of operations to be carried out by the storage system).

The timing of operations is driven by the simulation program, which in a preferred embodiment is a loop structure scheduling forthcoming events from each independent thread, polling the system clock from a known reference starting time and triggering operations as their scheduled time matches that of the clock. In another preferred embodiment, the simulation program thread event software objects may independently interrupt and initiate the port I/O as their next scheduled trigger time arrives.

Specific I/O interface configurations such as interface data transfer rate and protocol may be set either as an implemented structure in the definition file and simulation software, a runtime user option in the simulation software or by other host system configuration options.

BRIEF DESCRIPTION OF THE DRAWINGS

Embodiments of the invention will now be described in detail, by way of example, with reference to the accompanying drawings, in which.

DETAILED DESCRIPTION

In the following description of embodiments, reference is made to "threads", which have also been referred to above. A thread is a time sequenced plurality of operations, i.e. a plurality of operations in a sequence according to a timing schedule. The thread will have a common set of factors. Thus, the first thread may have a timing factor of 500 ms (frequency 2 Hz), involve a WRITE operation, three commands, and transfer two hundred sectors of data each command. A second thread may have a timing factor of 2s (frequency 0.5 Hz), be a READ operation, involve one command, and transfer one hundred sectors of data each command.

By running several threads an overall plurality of operations is created, which are time-interleaved according to their timing factors.

Moreover, subsequent discussion will refer to an "event". This is the occurrence of a single operation in a given thread, so that the total set of operations created by several threads running concurrently, each defined by a set of factors, results in a sequence of events, with the events being sequentially derived from respective ones of the various threads according to the respective timing factors of that thread. Hence, an event is when an operation is created, causing the storage system to run a task. In the present invention, timing information derived from the time difference of the, or the first of, the command(s) corresponding to the task, and the completion of the task, is determined to analyze the behaviour of the storage system. This will now be described in more detail.

Figure 1:
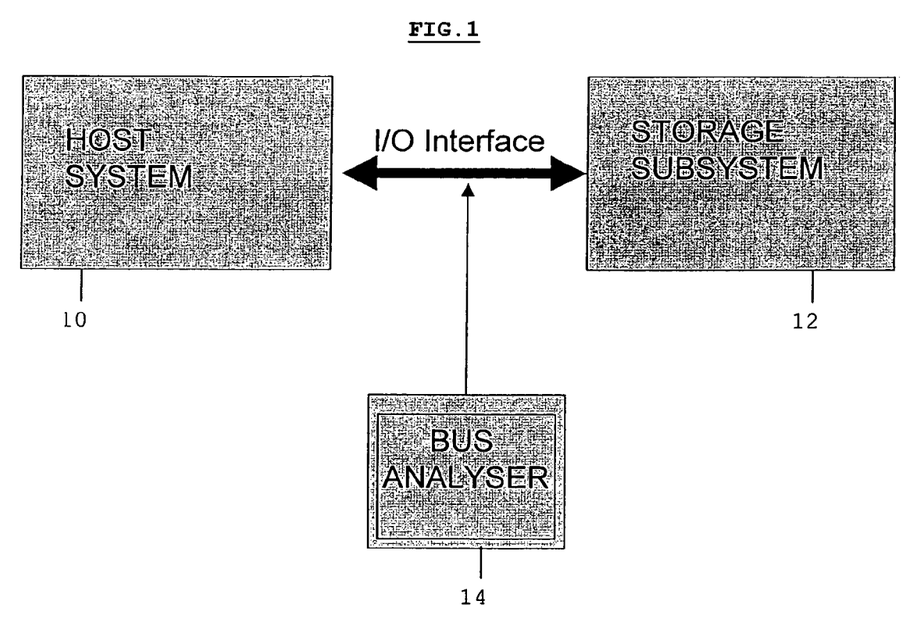
FIG. 1 shows a block diagram of a Host and Storage system architecture, with an interface bus analyzer attached.

In the embodiment, an electronic device or networked system has one or more hosts 10 connected to one or more storage device elements 12. A simple one to one example would be a Digital Video Recorder (DVR), which has a host controller using a standard hard disk interface to connect to a single hard disk drive. Regardless of the topology of the system, the complete application system has a specific purpose, achieved through the application of host electronics and software (The host 10) connected by an I/O interface to hard disk storage device elements 12 (The storage). With reference to FIG. 1 the host 10 will initiate READ and WRITE data commands and other device control functions, to the storage device elements 12 as required for the application purpose. The I/O transaction events which make up this 'data traffic' for a given continuous access application scenario, can generally be approximately defined by a pattern. The application scenario, for example, may be a data logging device, recording several external input values periodically. These patterns can be captured using a bus monitoring and analysis device 14, and then analyzed and interpreted by factorisation, with the individual I/O events interrelated by common factors with respect to data transfer direction, size, order, timing and storage location address. For example, a data logger may be writing to several different storage locations once a second, incrementing slowly in storage address for each data set. Additionally, to use data threads, there may be file system activity occurring at a common indexing address area, which can be quantified in terms of address range, average frequency and timing distribution of accesses, transfer size etc . . .

For these types of host-storage application systems, for many reasons during system design, evaluation or problem diagnosis, it is often necessary to understand the characteristics of the data access pattern, and the storage functional response or performance metrics resulting from the given data access pattern.

There are several situations in which direct analysis with the actual system are not practical or possible, or an emulation system is preferable; for example but not exhaustively:

(1) Many systems are not open computer systems, in which case access to the control architecture to allow variance of the working parameters, and measurement of system I/O metrics is impossible (e.g. consumer digital video recording system, music player etc . . . ).

(2) Critical systems are preferably uninterruptible and therefore unavailable for substantial exploratory testing and analysis.

(3) Probing the real system or interface to monitor in-system data traffic for analysis is complex; often expensive, requiring specialised equipment, and the data collected usually requires detailed expert analysis to draw conclusions. Also, it is only a passive exercise—not allowing application behavioural variances to be introduced to investigate the affects.

(4) The system may be merely a proposal or new application idea, in which case there is no physical prototype system in existence to test the storage response, and an emulation capability is mandatory to provide the likely host driven I/O workload.

Figure 2:
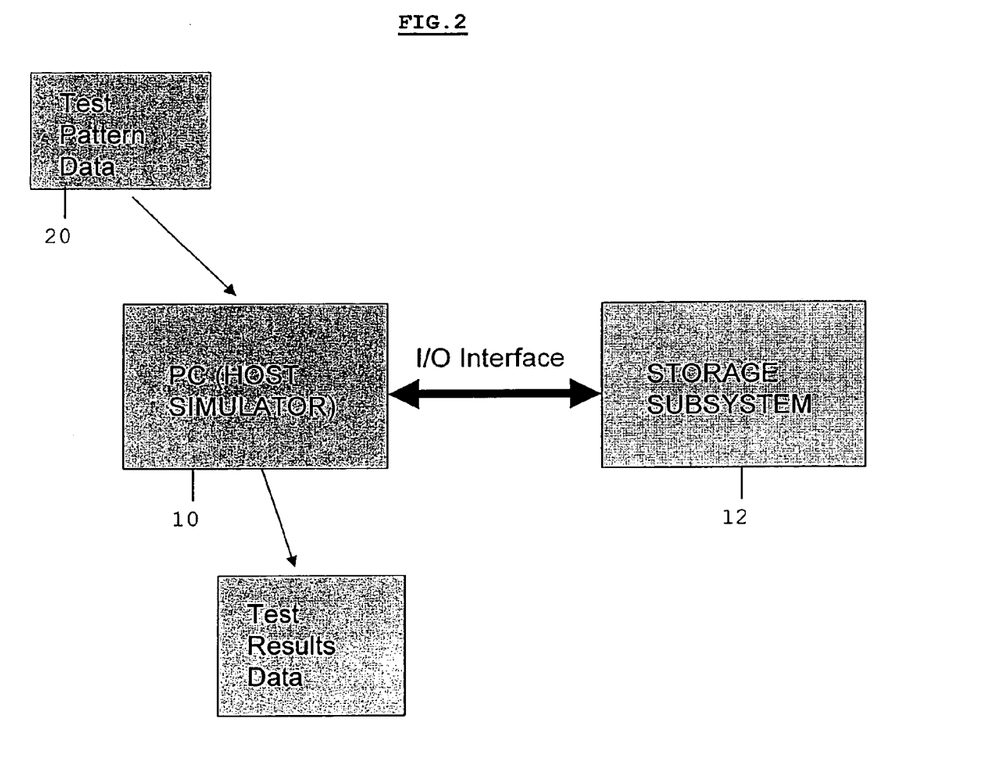
FIG. 2 shows a block diagram outlining a method of using a Host computer with appropriate hardware and software to replace the host system for test purposes.

FIG. 2 shows a method using a standard computer acting as host 10, for creating a representation 20 of a definable algorithmic data access pattern, including measurement of I/O response timings, which can then be connected to a target storage system 12 in order to test and measure the system interoperability and storage response and performance. The definition of the access pattern can be determined in a number of ways as discussed below. In a particular embodiment of the invention, the definition data is input to a software program, which interprets it and outputs an I/O request stream to the Storage interface port representing the desired data access pattern.

Further to this, the embodiment provides for statistical analysis of resultant monitored storage timing data in order to derive system metrics which assist in design or diagnostic decision making for system and storage engineers.

Figure 3:
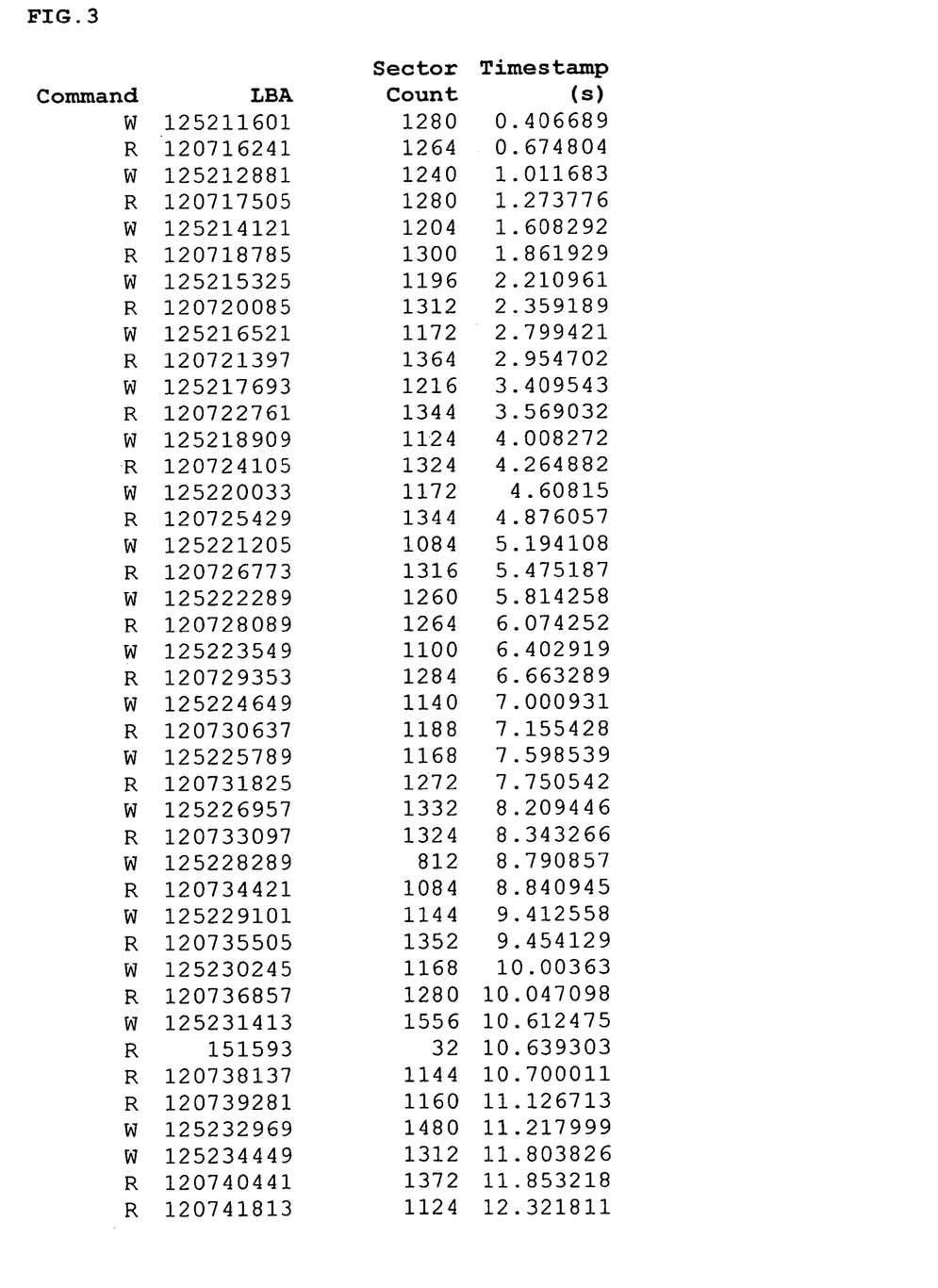
FIG. 3 shows a typical host application I/O interface bus trace, parsed into a columnar format.

In the example shown in FIG. 1, an interface bus analyzer is used as the monitoring and analysis device 14 to derive the data traffic of a given Host-Storage I/O activity. Using parsing software, this trace is ported into a spreadsheet application to allow easy statistical analysis. FIG. 3 shows a simplified example fragment of bus trace data ported into a columnar format.

Figure 4:
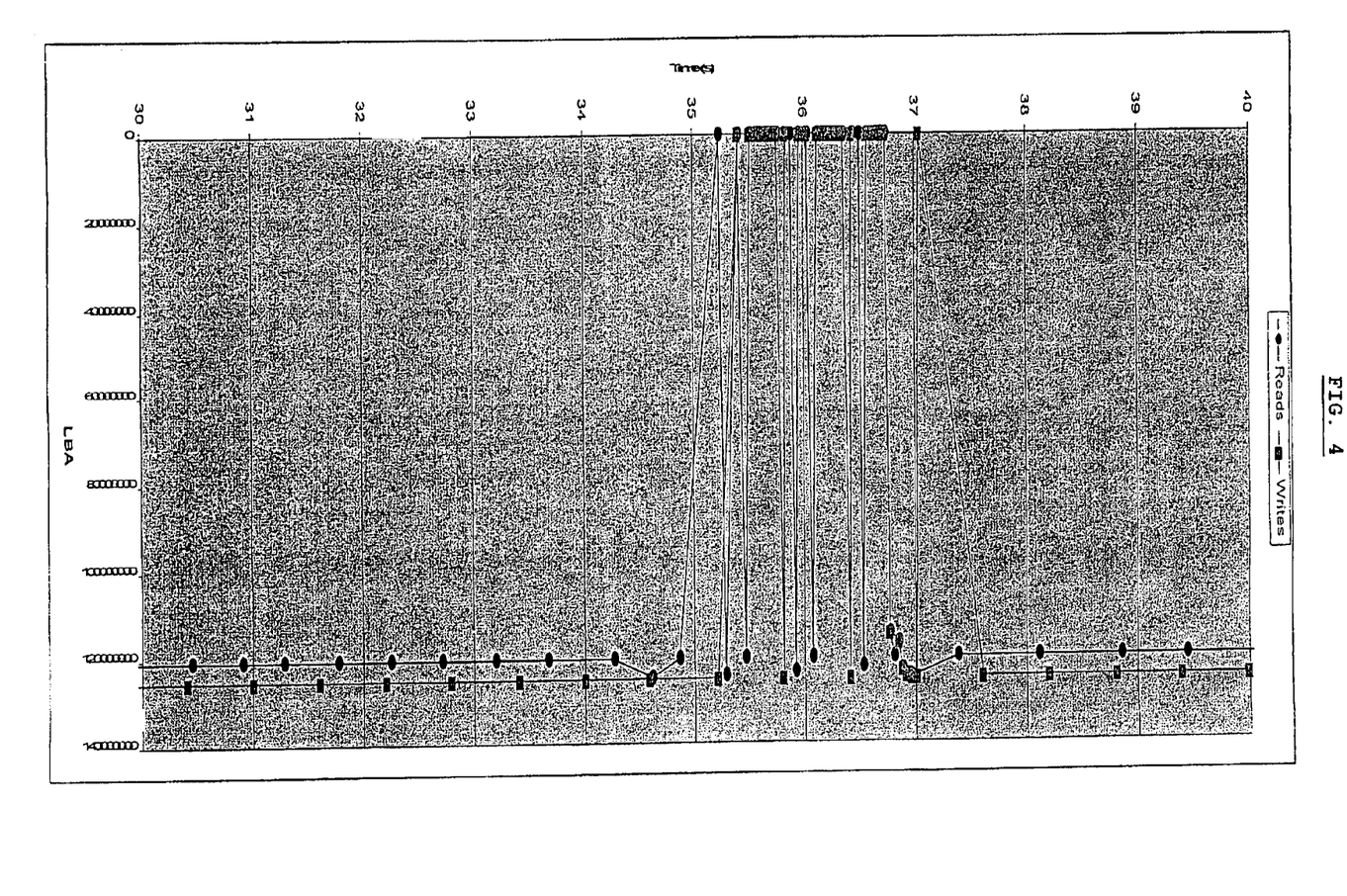
FIG. 4 shows an example graphical plot of storage I/O operations in a given application.
Figure 5:
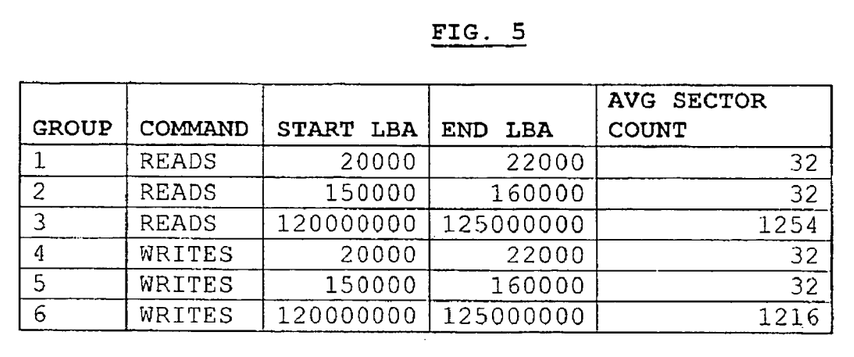
FIG. 5 shows an example summary of I/O operation groupings into threads.

From the trace it can be seen that a mixture of read and write commands have been monitored in time order, varying in start time, transfer size and storage address location. In this simple example, the general pattern can be seen in the time order sequence as a set of sequential read events at 1 address range, time interleaved with a set of sequential write events at another location. In more complex traces the events might appear at first to be random in nature, and the relative nature of groups of events may not be so obvious and require more sophisticated analysis. Using the simplified example further, graphical analysis (FIG. 4) shows a way of viewing the access pattern of a trace in order to appreciate the relative groups of events by type (read/write), time order and storage address range. A typical trace of thousands of events would be required in order to capture a statistically valid sample of activity from which to derive accurate factorial averages and distribution statistics. However, assuming such data is available, sorting and dividing the data by various factors allows common groups of events to emerge by factorial distribution and grouping. An example sequence of factorisations to sort the data and derive groups are: divide into read and write groups, sort each by LBA, divide into LBA ranges and sort each again by time. FIG. 5 shows an example of the basic unique properties of each group as derived from an event trace.

Once approximate groups of events (threads) have been identified, the event inter-relationships within a group with respect to time, address, transfer size etc . . . can be determined. Particular factors like the timing pattern and frequency of events in a given group, and size of data transfer may be constant values or varying (typically across a narrow distribution), both of which can be defined. Typically for workloads with isochronous characteristics i.e. AV application system, timing and transfer sizes tend to be regular and periodic and so should be reflected by absolute values or very short-tailed distributions.

Figure 6:
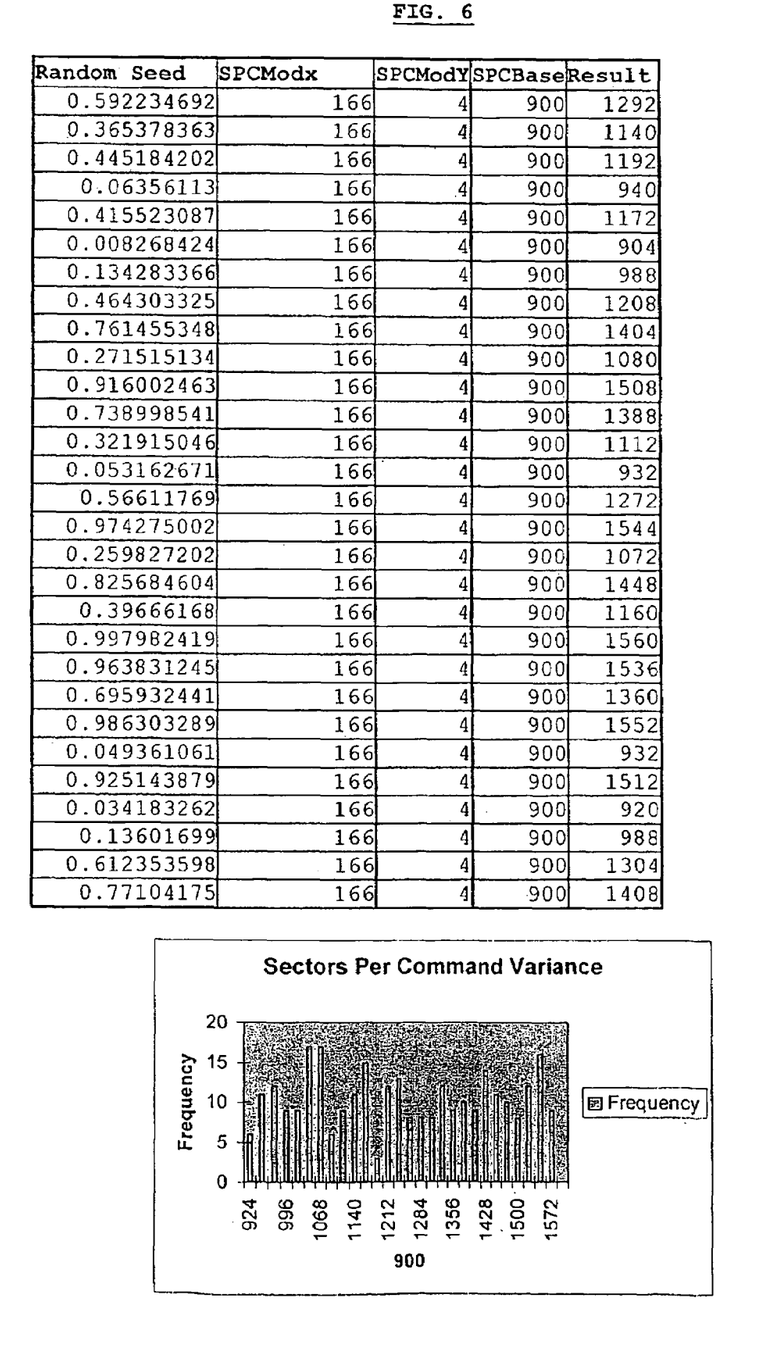
FIG. 6 shows an example table and histogram of a random variance generation algorithm for Sector counts of I/O commands.

FIG. 6 shows how an event parameter like transfer size can be constantly varied based on a function which applies variance to a base parameter value for each event, so that approximately the required variance and distribution achieving the required average values can be created.

In this example the variance is random and evenly distributed. The defining parameters for the transfer size are:

SectorsPerCommandBase=900
SPCModX=166
SPCModY=4
Variance Type=R (Random seed)

Variance Type defines the function to which the other parameters are applied. In this case the function uses a random seed between 0 and 1 (evenly distributed) as follows:

SectorPerCommandBase+(Integer
(Randomseed*SPCModX)*SPCModY))

The functions available to control the variability of these factors are programmed into the simulation engine and defined at the event group (thread or stream) level in the definition file. Alternative variance functions might be fixed (set base value, no variance), random normal distribution about a median, incrementing etc.

Figure 7:
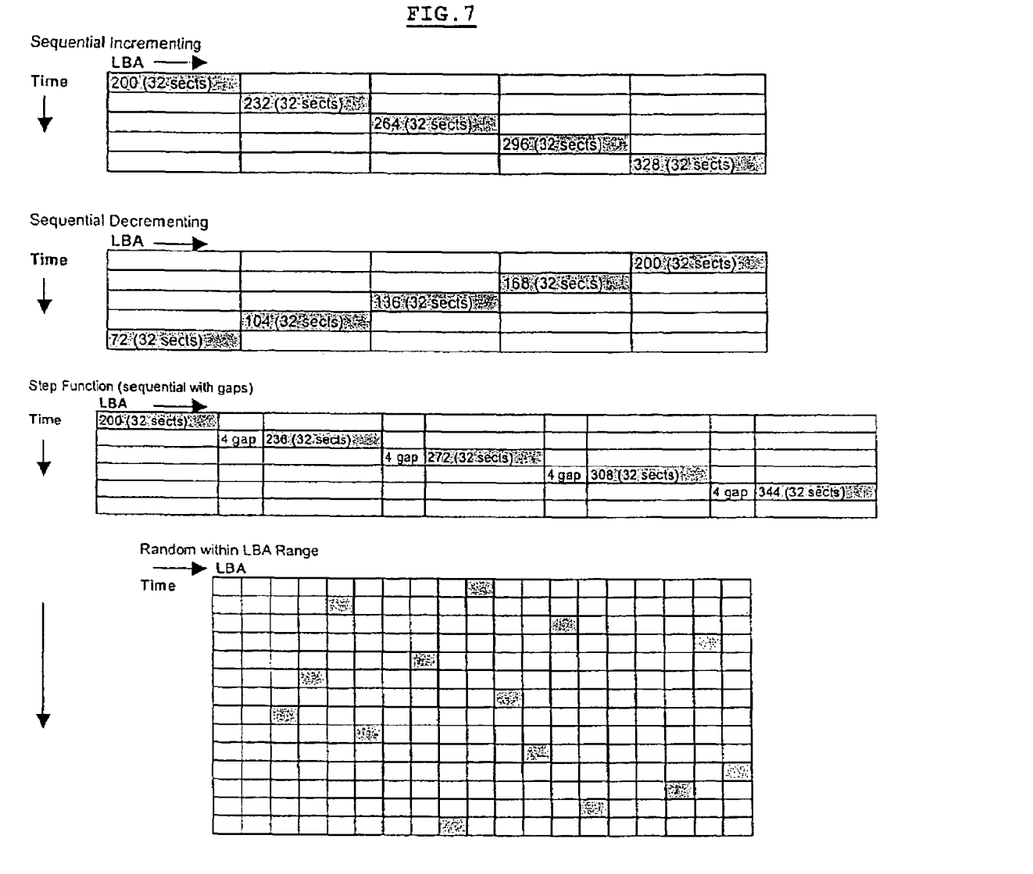
FIG. 7 shows various examples of storage address location patterns in typical threads.

The relative start address of time ordered events in a group can also be analyzed, to ascertain whether overall data access for a given range is contiguous, whether there is a common gap function (in sectors) between command start addresses, and whether the start address is incrementing or decrementing relative to the previous event. (FIG. 7 shows various common examples of access address patterns). If events are sequential in nature (positive or negative address changes), then the range of addresses can be set and when the limits are reached the sequence can begin from the start address again. The number of cycles can also be set.

The overall process of statistical grouping, sorting and deriving event relationships can be applied to obtain parameters for each derived thread, which when input to the workload definition, control the exact nature of the generated I/O threads in terms of:

a. event types e.g. read, write, special commands & specific command sequences;
b. event location patterns (device and data address)—spatial locality and iterative event address progression patterns;
c. event transfer size characteristics; and
d. event timing characteristics—the time domain pattern.

Figure 8:
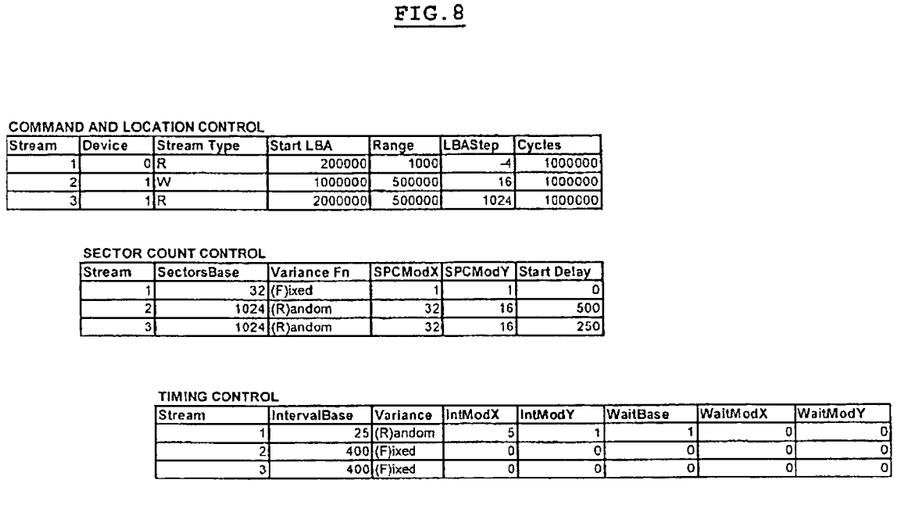
FIG. 8 shows an example multi-thread definition parameter table.

FIG. 8 shows the example derivation of X groups of events (threads) by storage address location, and the parameters which describe those threads. This set of threads represent a close approximation of the original data access pattern monitored in the system, and can be used to simulate the application host I/O requests while measuring storage response times.

In another example, a real system streaming workload (a definition of sets of factors for several threads), derived as the above method describes, may be manipulated with respect to event frequency, location, transfer size etc . . . in order to factorially change the access pattern characteristics to investigate the effects or explore performance or functional design boundaries. I.e. The event transfer size of a thread could be halved while the event frequency could be doubled to see what effect this has on the system and storage. In another practical example, increasing the transfer size or decreasing event time interval will increase data rate of a thread, for instance, when the objective is to emulate a Fast-Forward or Rewind function in an A/V application.

In yet another example, the workload may be defined purely hypothetically, in order to define a group of threads based on a particular system application requirement, i.e. data organisation (file system or metadata) and isochronous transfer rate proposal. (The transfer rate of a thread is implied by the mean transfer size and timing interval resulting from the definition file.)

Figure 9:
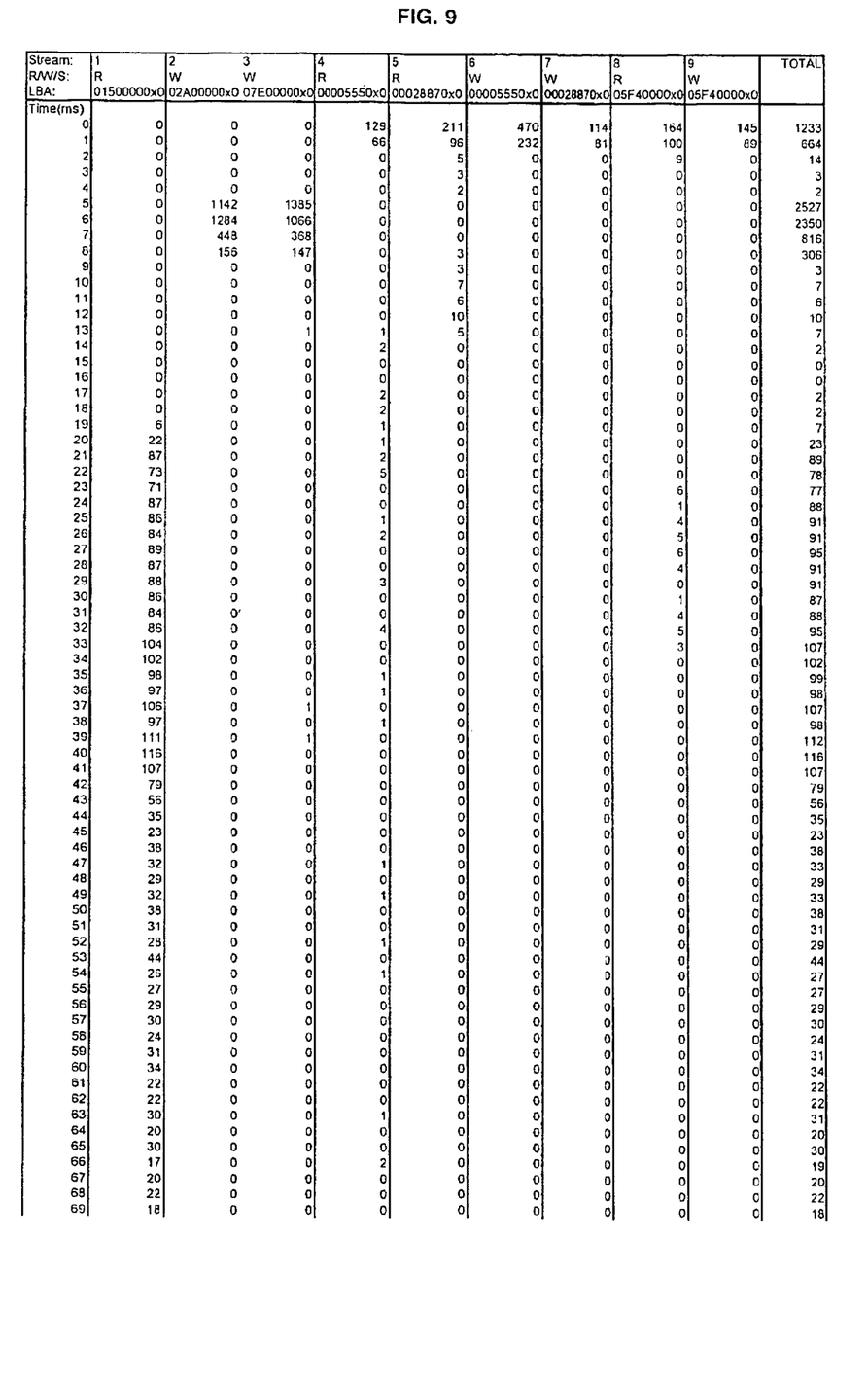
FIG. 9 shows an example output data histogram of command completion times.

In a particular embodiment, the definition can be loaded into the simulating computer. The computer runs a program which interprets the definition file and accordingly creates I/O requests at the Storage Interface port, representing the desired data access pattern. The program can control the total run time of the workload profile, in order ensure repeatability of iterative test runs. The program logs all I/O request-to-completion times; in a preferred embodiment, as a histogram of command counts by millisecond timing, displayed by thread (FIG. 9).

The program also monitors event lateness (operation start latency) beyond a set threshold (where previous events are still ongoing at the storage system and therefore delay subsequent event start times). This data allows interpretation by the user of how well the total system in any given configuration, achieves the response times required by a time dependant application (isochronous) emulation and also, whether an event time deadline is breached. An example of such a system is the digital video recorder, where real time video/audio data being recorded or played back must be transferred at a minimum average rate in order to prevent data loss either in the written data to the storage or the read data represented on the viewing medium. The lateness data allows the user to observe whether a workload becomes increasingly delayed i.e. the storage bandwidth is saturated, or how much buffering would be required to absorb the delays incurred without breaching the buffering deadline (buffer under-run or over-run).

The data collected is used to derive meaningful performance and functional conclusions, such as overall data rate, data rate per stream, effectiveness (hit rate) of caching algorithms, storage command completion time distribution, total storage busy vs. idle time at the interface bus, and the relative contribution of various threads. Any test which results in 100% busy time implies no margin for isochronous workload.

The program can be provided with global modulation parameters which can modify individual thread parameters of every thread.

With a repeatable method of measuring system overall and thread level performance, and the ability to manipulate many basic characteristics of the workload and run comparative tests, many design factors may be explored including:

(a) Access pattern factors—the design of the host interface, data organisation (file system and file layout), I/O size, number of streams, stream interleave, internal host scatter/gather algorithm etc . . . .

(b) Physical factors—under repeatable application representative workloads, sensitivity to mechanical rigidity and general design of the storage device mounting enclosure, injection of environmental factors i.e. temperature, vibration . . . .

(c) Storage system configuration—interface and system I/O modes of operation, caching configurations.

As set forth above, the present invention is described by way of the preferred embodiment but is not limited to the above embodiment. From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of analyzing the behaviour of a storage system when running an input/output (I/O) workload, the method comprising:
   (a) creating an isochronous thread formed by a sequence of operations to be carried out by the storage system when running the thread, the thread being created by:
      (i) defining a plurality of factors, each factor corresponding to an aspect of the thread when running the I/O workload, the plurality of factors enabling absolute control over iterative access location, transfer size and access type of the operations of said sequence of operations;
      (ii) defining one or more timing factors corresponding to a frequency characteristic and a timing pattern for each of the operations of said sequence of operations;
   (b) causing the storage system to run the I/O workload by:
      (i) interpreting the one or more timing factors of each operation of said sequence of operations to determine a scheduled time for the corresponding operation;
      (ii) for each operation in said sequence of operations interpreting the factors of each operation to determine respective operation characteristics for the corresponding operation of said sequence of operations;
      (iii) for each operation in said sequence of operations, converting the operation characteristics to at least one command for the storage system;
      (iv) for each operation of said sequence of operations, sending the at least one command to the storage system at a sending time, the sending time being either said scheduled time or the earliest subsequent time the storage system is ready to accept the at least one command of the respective operation of the sequence of operations, whichever is later;
      (v) for each operation of said sequence of operations, detecting the time of completion of each command of the corresponding operation by the storage system;
      (vi) deriving, from the time of completion of each command of each operation of said sequence of operations, a time of completion of the corresponding operation of said sequence of operations;
      (vii) storing the time difference between said sending time and said time of completion of each operation of said sequence of operations;
      (viii) storing any operation start time latency, said operation start time latency being the difference, if any, in time between said scheduled time and said sending time for each operation of said sequence of operations;
   (c) analyzing said time differences and said operation start latencies of said sequence of operations, thereby to analyze the behaviour of the storage system.

2. The method according to claim 1 wherein said analyzing step analyzes said operation start time latencies only when the duration of respective operation start time latency is greater than a predetermined threshold value.

3. The method according to claim 1 further including storing the time difference between the sending time and said times of completion of each command of each operation of said sequence of operations.

4. A method of analyzing the behaviour of a storage system when running an input/output (I/O) workload, the method comprising:
   (a) creating a plurality of threads, each thread being formed by a corresponding sequence of operations to be carried out by the storage system when running the respective thread, each thread being created by:
      (i) defining a plurality of factors, each factor corresponding to an aspect of the thread when running the I/O workload, the plurality of factors of at least one of said threads enabling absolute control over iterative access location, transfer size and access type of the operations of said sequence of operations;
      (ii) defining one or more timing factors corresponding to a frequency characteristic and a timing pattern for each of the operations of said sequence of operations;
   (b) causing the storage system to run the I/O workload by:
      (i) interpreting the one or more timing factors of each operation of said sequence of operations of each thread of a plurality of threads, thereby to define an interleaved sequence of operations containing all the operations of all the plurality of threads including a scheduled time for each operation of said interleaved sequence of operations;
      (ii) for each operation in said interleaved sequence of operations, interpreting the factors of each operation to determine respective operation characteristics of the corresponding operation of said interleaved sequence of operations;
      (iii) for each operation in said interleaved sequence of operations, sending the at least one command for the storage system at a sending time, the sending time being either said scheduled time or the earliest subsequent time the storage system is ready to accept the first of the at least one command of the respective operation of said interleaved sequence of operations, whichever is later;
      (iv) for each operation of said interleaved sequence of operations, detecting the time of completion of each command of the corresponding operation by the storage system;
      (v) deriving, from the time of completion of each command of each operation of said interleaved sequence of operations, a time of completion of the corresponding operation of said interleaved sequence of operations;
      (vi) storing the time difference between said sending time and said time of completion of each operation of said interleaved sequence of operations;
      (vii) storing any operation start time latency, said operation start time latency being the difference, if any, in time between said scheduled time and said sending time;
      (viii) analyzing said time differences and said operation start latencies of said sequences of operation of said plurality of threads, thereby to analyze the behaviour of the storage system.

5. The method according to claim 4, wherein said analyzing step analyzes said operation start time latencies only when the duration of the respective operation start time latency is greater than a predetermined threshold value.

6. The method according to claim 4, further including storing the time difference between said sending time and said times of completion of each command of each operation in said interleaved sequence of operations.

7. The method according to claim 4, wherein said plurality of factors enable absolute control over iterative access location, transfer size and access type of operations of said sequence of operations for only some of said threads.

* * * * *